Jan. 6, 1953 C. W. SWAN 2,624,799
RANGE FINDER FOR TELEGRAPH SELECTORS
Filed Nov. 16, 1951 2 SHEETS—SHEET 1
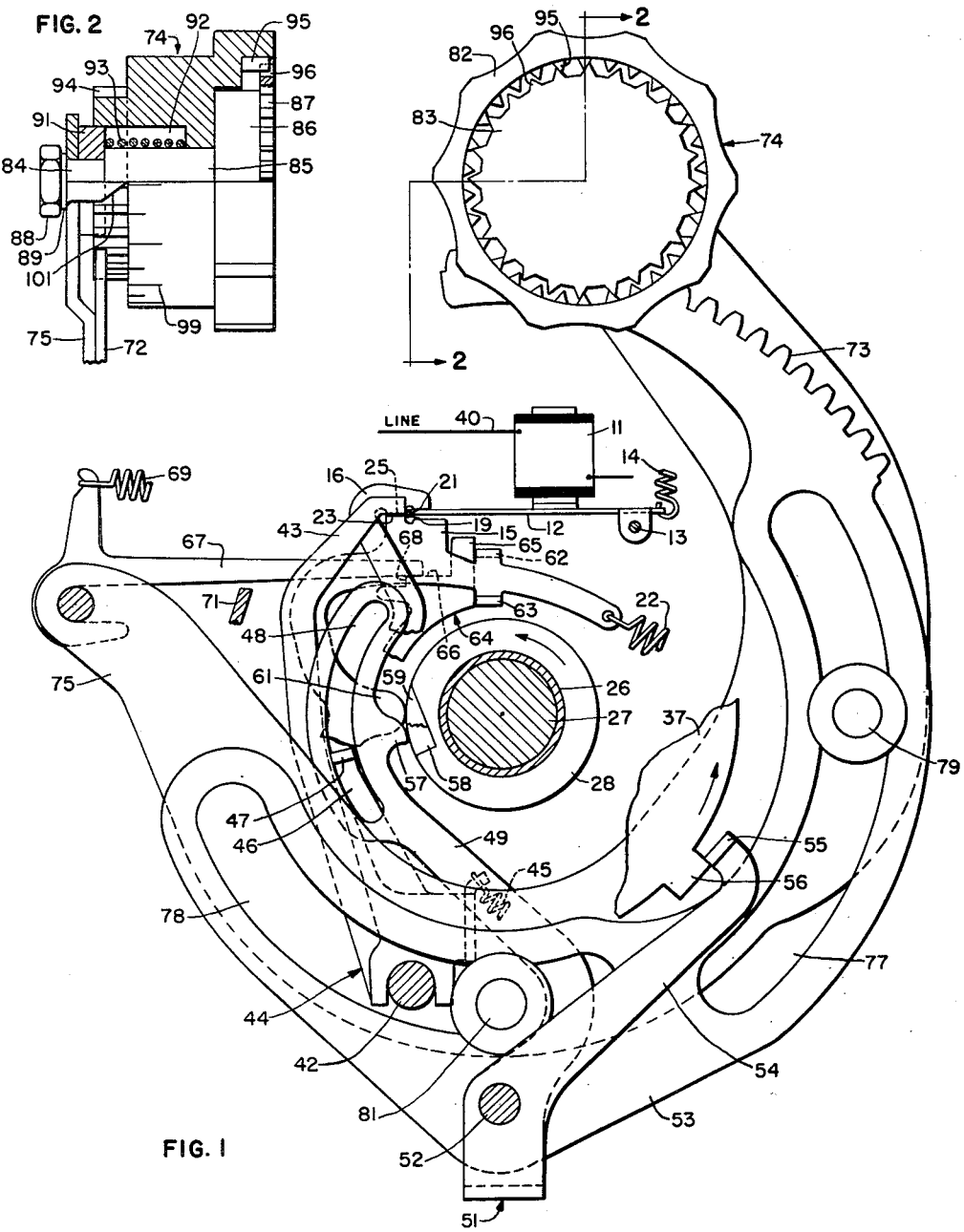
INVENTOR
CARL W. SWAN
BY Emery Robinson
ATTORNEY Jan. 6, 1953        C. W. SWAN        2,624,799
RANGE FINDER FOR TELEGRAPH SELECTORS
Filed Nov. 16, 1951        2 SHEETS—SHEET 2

INVENTOR
CARL W. SWAN
BY *Emery Robinson*
ATTORNEY

Patented Jan. 6, 1953

2,624,799

UNITED STATES PATENT OFFICE 2,624,799

RANGE FINDER FOR TELEGRAPH SELECTORS

Carl W. Swan, Skokie, Ill., assignor to Teletype Corporation, Chicago, Ill., a corporation of Delaware Application November 16, 1951, Serial No. 256,776

11 Claims. (Cl. 178—33)

The present invention relates to printing telegraph apparatus and more particularly to orientation means therefor.

The principal object of the invention is to provide means for accurately adjusting the angular positionment of a receiving selector drum to coincide with the time of arrival of signal impulses.

Another object of the invention is to provide a rack and pinion orientation device which includes a vernier-type adjusting means associated with the pinion that automatically locks the range finder on the scale within close limits.

In the process of orientation, it is desired to position the selecting intervals of the receiving selector with respect to the incoming signal impulses so that the midpoints of the line signal impulses will be received during said intervals. To take an orientation range a test sentence is transmitted to the printer continually while the range is being taken. While this sentence is being received, the orientation scale is shifted toward "zero" until errors begin to appear in the test sentence. The orientation scale is then moved back slowly until these errors disappear. This position indicates one limit of the orientation range and the position is noted on the scale. The same performance is repeated toward the opposite end of the scale to find the other limit. After the two limits (or extreme positions of perfect printing) have been found, the orientation scale should be set midway between these two points.

A feature according to the present invention resides in providing an adjusting means comprising an internal gear integral with the adjusting knob, said gear having V-shaped teeth adapted to cooperate with a lesser number of identical teeth on a fixed cooperating member so that the peaks of a predetermined number of pairs of teeth will mesh in each adjusted position to lock the orientation device in any position.

A more comprehensive understanding of the invention may be had by reference to the following detailed description when considered in conjunction with the accompanying drawings, wherein;

Fig. 1 is an elevational view of the orientation device embodying the present invention;

Fig. 2 is a view taken substantially on line 2—2 of Fig. 1, and

Figure 3:
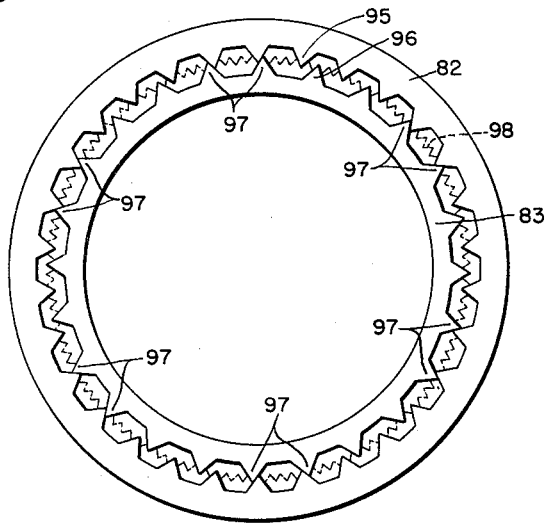
Figs. 3 and 4 are views illustrating the locking relationships between different ratios of teeth on the fixed and rotatable portions of the vernier-type adjusting device according to the present invention.

Having reference to the drawings, the orientation device according to the present invention is shown as adapted to a selector mechanism of the type shown in copending application Serial No. 82,391, filed March 19, 1949, now Patent No. 2,595,746, dated May 6, 1952, by W. J. Zenner. In Fig. 1 the numeric 11 designates the selector magnet which is considered as suitably and appropriately supported by means (not shown) in the telegraph printer apparatus. Associated with the selector magnet 11 is an armature member 12 pivotally mounted on a pivot shaft 13. Armature member 12 is normally biased counterclockwise (as viewed in Fig. 1) by a spring 14. As described in copending application, a pair of sensing levers 15 and 16 provide an interlocking means to lock the armature 12 in marking or spacing position during the respective signal impulse interval under the control of a pair of control cams (not shown).

It is observed that the sensing levers or sensors 15 and 16 are provided with oppositely disposed confronting shoulder portions 19 and 21, respectively, which cooperate with the extremity of the armature 12. When the armature 12 is in the marking position (solid line position in Fig. 1), the sensor 15 will be urged by its spring 22, when permitted by its cam (not shown), to position a table portion 23 underneath the outer end portion of armature 12 so that the armature 12 becomes locked between the shouldered portion 21 of lever 16 and table portion 23 of lever 15. On the other hand, when the armature 12 is in the spacing position (dotted line position in Fig. 1), the sensor 16 will be spring urged, when permitted by its cam (not shown), to position its locking surface 25 above the outer end portion of armature 12 so that the armature 12 becomes locked between the shouldered portion 19 of sensor 15 and the surface 25 of sensor 16.

The sensor control cams (not here illustrated, but clearly shown and described in said copending application) are carried on a sleeve 26 mounted on a shaft 27. Also carried on the sleeve 26 are a start cam 28, five selector cams (not shown) and a bail operating cam (not shown). A stop disc 37 is also carried on the sleeve 26. The aforementioned cams and stop disc are angularly arranged on the sleeve 26 in a manner to effect, in predetermined timed relation, the operation of the follower elements or selectors 41 in response to the received code signal impulses. The cam notches on the selector cams are arranged in helical manner, and the cam sleeve 26 is rotated at a speed commensurate with the speed of code impulsing. The sensors 15 and 16, and the selectors 41 are mounted pivotally on a pivot shaft 42.

In accordance with well-known practice, the normal condition of the signal line 40 is a marking condition; that is, current on the line. In this condition, the selector magnet 11 is normally energized and its armature 12 is pulled up, in opposition to spring 14, as indicated in Fig. 1, with its extremity engaging the shoulder 21 of the sensing lever 16. The extremity of armature 12 is also engaged by the upper end of an arm 43 of a substantially U-shaped release lever 44 mounted pivotally on the pivot shaft 42. Lever 44 is normally biased clockwise (as viewed in Fig. 1) by a spring 45, and is also provided with an arm 46.

Arm 46 of lever 44 is provided with a laterally directed portion 47 (extending forwardly toward the reader, as viewed in Fig. 1), which cooperates with an arcuate slot 48 in a start-stop lever 51 mounted pivotally on a pivot stud 52 carried on the movable orientation plate 53. The other arm 54 of start-stop lever 51 is provided at its extremity with a suitably conformed stop portion 55 which cooperates with the stop projection 58 on the stop disc 37. The arm 49 of start-stop lever 51 is provided with a cam follower projection 57 which confronts a notch 58 formed in the disc 28 in the stop position of the cam sleeve 26, and the stop portion 55 engages the stop projection 56 of the stop disc 37.

In the stop position of the cam sleeve 26, the control cam 59 presents a high portion to its cam follower 61 on the sensor 15 so as to hold the shoulder 19 out of the path of the extremity of the armature 12. At the same time, the control cam associated with the sensing lever 16 presents a low portion thereof to the cam follower of said lever 16. Simultaneously, the start cam 28 presents its low portion 58 to the cam follower 57 of arm 49 associated with the release lever 44. In this relative position of the sensor control cams and start cam 28, the levers 15, 16 and arm 43 of lever 44 are held in the position shown in Fig. 1 during the stop interval. Now, in response to a start signal impulse, which is of spacing (or no current) nature, the selector magnet 11 will become de-energized and the spring 14 will urge the armature 12 away from the magnet core to the dotted position shown in Fig. 1. In this condition, the extremity of armature 12 is disengaged from the extremity of release lever arm 43 thus permitting the release lever 44 to respond to the pull of its spring 45 due to the presence of the cam notch 58 of cam 28 in front of the follower 57 of lever arm 49.

Release lever 44, through its articulation to start-stop lever 51 (by means of lateral portion 47 and arcuate slot 48), will be permitted to rotate a predetermined amount in a clockwise direction (as viewed in Fig. 1) determined by the depth of notch 58 opposite cam follower 57 (in the start and stop position). The start-stop lever 51 is thus rotated clockwise a sufficient amount to release the end 55 from the stop projection 56 to permit the cam sleeve 26 to rotate. The cam 28 will, after a predetermined amount of rotation sufficient to permit the stop lug 56 to escape end 55, thereafter function to hold the lever 51 in its counterclockwise position to prevent vibration thereof during the signaling period and until the stop period is reached whereat the lever arm 43 will again become blocked by the armature 12, as hereinbefore described, and be effective to hold the start-stop lever 51 in its counterclockwise position to stop the rotation of disc 37 after the completion of one cycle of rotation.

The sensing lever 15 is provided at its upper end with a pair of arms 62 and 63 projecting from each side thereof (that is, as viewed in Fig. 1, arm 62 projects rearwardly, away from the reader, and arm 63 projects forwardly toward the reader) sufficiently to span the upper ends of the series of selector levers or follower elements 64, which are supported pivotally on the pivot shaft 42. The elements 64 are normally biased clockwise by individual springs (not shown) to tend to cooperate with arms 62 and 63 when permitted to do so by its control cam (not shown) and armature 12 as described in said copending application.

The follower elements 64 are each provided with a bearing surface 65 by means of which they normally tend to rest against the arms 62 or 63. The follower elements 64 are also provided with a stepped portion 66 adapted to cooperate with interponents 67 individually associated therewith, in a manner such that when a follower element 64 is actuated clockwise selectively, the shoulder 68 thereon engages the extremity of the interponent 67 so that when the element 64 is returned to its counterclockwise position shown in Fig. 1, the interponent 67 will be actuated leftwardly against the pull of its spring 69 to perform further selective operations as described in said copending application. In timed relation, the interponents 67 are disengaged from the shoulders 68 by a bail 71.

The orientation device according to the present invention comprises an arcuate member or adjusting plate 53 arranged concentrically with the shaft 27 and adapted to be rotated thereabout by means of a positive orientation control device. As shown in Fig. 1, the adjusting plate 53 is provided with a segmental gear rack portion 73 adapted to cooperate with a range finder knob and detent arrangement indicated generally by the numeric 74. The instrumentalities for governing the orientation operation are mounted on a fixed bracket 75 appropriately mounted in the printing apparatus. Plate 53 is provided with two arcuate slots 77 and 78 concentric with said shaft 27.

Plate 53 is slidably mounted relative to fixed bracket 75 through the instrumentality of a pair of guide studs 79 and 81 secured to bracket 75 and adapted to cooperate with slots 77 and 78, respectively. As previously mentioned, the start-stop lever 51 is pivotally carried on the adjusting plate 53 by means of a stud 52.

The range finder knob and detent arrangement 74 comprises a knob 82 and a detent 83. The detent 83 is substantially a stud and includes a threaded portion 84, shank portion 85, shoulder portion 86 and toothed portion 87. Detent 83 is held fast to the bracket 75 by means of a nut 88 and lock washer 89 with a circular spacer member 91 embraced between the shank portion 85 and the plate 75. The knob 82 is counterbored at 92 to slidably fit over the spacer 91. Between the spacer 91 and bottom of bore 92 is a compression spring 93 which encircles the shank portion 85. By the action of spring 93, the knob 82 is pressed against the shoulder portion 86. The knob 82 is provided with gear teeth 94 (Fig.

2) adapted to mesh with the segmental gear rack portion 73 of the adjusting plate 53.

Knob 82 is provided with internal gear teeth 95 of substantially V-shaped conformation, which is adapted to mesh, in an interlocking manner according to the invention, with corresponding gear teeth 96 formed on the toothed portion 87 of the stud 83. In the operation of the knob and detent arrangement 74, the knob 82 is pressed inwardly toward the frame 75 (leftwardly as viewed in Fig. 2) thereby compressing the spring 93, thus disengaging teeth 95 from teeth 96. It is thus possible to turn the knob 82 to obtain through pinion 94 and rack 73 the proper adjustment of the orientation range. Then when the knob 82 is released, the spring 93 will urge the teeth 95 into interlocking meshing engagement with the teeth 96.

Figure 4:
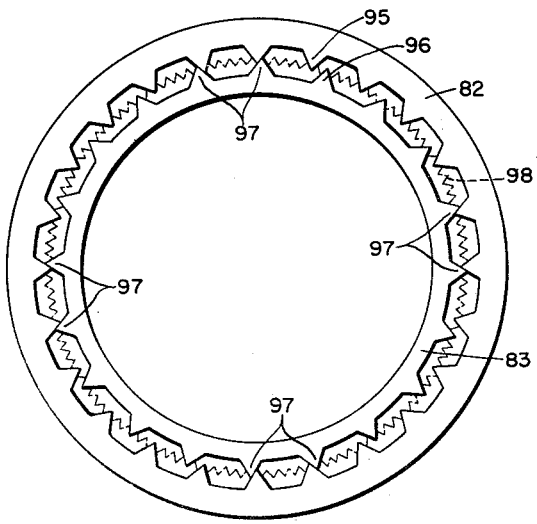

An important feature of the invention resides in the arrangement and conformation of the teeth 95 and 96. The arrangement of the teeth is predicated on the principle of the vernier, the number of the teeth on the knob varying from the number of teeth on the fixed stud portion 87. For example, with a predetermined ratio between the teeth on the knob and the stud, the teeth will mesh in pairs in a predetermined number of equi-angularly spaced places. With the ratio of teeth indicated in Figs. 1 and 3; namely, 30 teeth in knob 82, and 24 teeth in stud 83, the knob teeth and stud teeth will always mesh at six places 97, Fig. 3. The showing in Figs. 3 and 4 represents an enlargement over the actual size of teeth contemplated, so that if the teeth 95 and 96 in members 82 and 83 were made as exemplified by the zig-zag line 98, then the teeth would be so fine as to be difficult to manufacture. One of the objects, therefore, of the present invention is to make the teeth large enough so that their peaks only will mesh. Then, instead of meshing every tooth, they would mesh only at predetermined places. Therefore, the zig-zag line 98 in the embodiment shown is an imaginary line, representing the relative positionments of the teeth in their various adjusted positions. It is observed that the teeth mesh at predetermined places in pairs; that is, two adjacent teeth in one member embrace two correspondingly adjacent teeth in the other member in interlocking manner. Thus, when the knob 82 is pressed inwardly (toward the left in Fig. 2) against the action of spring 93, and then turned a desired amount, then released, a different group of six pairs of teeth knob 82 will mesh in an interlocking manner with six pairs of teeth in the detent member or stud 83, if the ratio in Fig. 3 is used. The meshing will occur in four places if the ratio in Fig. 4 is used; namely, 24 teeth in knob 82 and 20 teeth in detent member or stud 83. Of course, the lesser number of teeth can be in the knob and the greater number in the detent.

In the embodiments shown in Figs. 3 and 4, each tooth width on the imaginary line 98 represents three degrees, indicating that adjustments of three degree steps are obtainable. Of course, steps of finer or coarser adjustment are possible. For example, if a ratio of 30T/40T is employed, meshing will occur at ten equi-angularly spaced places. The application of the vernier principle is evidenced by the fact that for each elemental or unitary step (3 degrees in the embodiments shown) different pairs of teeth in circumferential progression will become operative to give the interlocking effect. The hub of the knob member 82 is provided with graduations 99 (Fig. 2) which cooperate with a fixed index pointer 101 to function as the orientation scale.

In the operation of the device according to the present invention, the normal stop condition of the apparatus is as shown in Fig. 1 with the selector magnet 11 energized by marking current on the line 40, the arm 43 of release lever 44 blocked by the armature 12, and the rotation of the stop disc 37 arrested by the start-stop lever 51. Since the start-stop lever 51 is carried on the movable orientation plate 53, it is movable therewith so that as the plate 53 is rotated, the pivot 52 for carrying lever 51 will revolve about shaft 27 in a planetary manner, and since the distance between pivot 52 and the extremity 55 of lever 51 is invariable, the stop position of lug 56 of stop disc 37 may be varied by the rotation of plate 53. Because of the fact that the disengagement of lever 51 is controlled by the release lever 44 in all positions of lever 51, the arcuate slot 46 is provided which is of appropriate conformation to compensate for the movement of said lever 51.

As previously mentioned, the plate 53, being concentrically supported with respect to the shaft 27, is rotated thereabout on guide studs 79 and 81 operating in slots 77 and 78 respectively, by the knob and detent arrangement 74 operating through rack segment 73. To obtain this movement of plate 53 in either a clockwise or counterclockwise direction, the knob portion 82 is pressed inwardly to disengage teeth 95 from teeth 96. The knob 82 is then turned an amount to obtain the desired adjustment and then released. When thus released, the knob 82 and stud 83 will be securely locked together due to the interlocking effect of the plurality of pairs 97 of teeth 95 and 96.

It is understood that the above-described arrangement is merely illustrative of the application of the principles of the invention. Numerous other arrangements may be readily devised by those skilled in the art which will embody principles of the invention and fall within the spirit and scope thereof.

What is claimed is:

1. In a telegraph receiver, a selector mechanism responsive to code combinations of impulses to condition the receiver for operation, said mechanism comprising a cam drum subjected to a constant torque and operated in synchronism with the speed of code impulsing, a rotatable orientation plate mounted concentrically with said cam drum, stop means mounted on said plate for controlling said cam drum, rack and pinion means operably associated with said plate for rotating said plate to various angularly adjusted positions, whereby orientation of said cam drum is effected, and detent means comprising a first element and a second element operably associated with said rack and pinion means, said first element having a predetermined number of teeth adapted to cooperate with a predetermined lesser number of teeth on said second element so that the peaks of a predetermined number of pairs of teeth will mesh in interlocking engagement in each adjusted position of said orientation.

2. In a telegraph receiver, a selector mechanism responsive to code combinations of impulses to condition the receiver for operation, said mechanism comprising a cam drum subjected to a constant torque and operated in synchronism with the speed of code impulsing, a rotatable orientation plate mounted concentrically with said cam drum, stop means mounted on said plate for controlling said cam drum, rack and pinion means operably associated with said plate for rotating said plate to various angularly adjusted positions, whereby orientation of said cam drum is effected, and detent means comprising a first element and a second element operably associated with said rack and pinion means, said first element including rack and pinion means, said first element including an internal gear having V-shaped teeth adapted to cooperate with a lesser number of identical teeth on said second element so that the peaks of a predetermined number of pairs of teeth will mesh in interlocking engagement in each adjusted position of said orientation.

3. In a telegraph receiver, a selecting mechanism responsive to received code combinations of electrical impulses comprising a set of selectors, an electromagnet, an armature lever therefor, and a cyclically operable cam member cooperating with said armature lever to set said selectors in different combinations, means for rotating said cam member, a movably pivoted stop element for arresting said cam member, a fixed pivoted member controlled by said armature lever for holding said stop element in operative position, and means comprising a knob and detent arrangement for varying the relative positionment of said movably pivoted stop element and said fixedly pivoted member, whereby orientation of said cam drum may be effected, said arrangement comprising an internal gear integral with said knob, said gear having V-shaped teeth adapted to cooperate with a lesser number of identical teeth on said detent so that the peaks of a predetermined number of pairs of teeth will mesh in interlocking engagement in each adjusted position of said orientation.

4. In a telegraph receiver, a selector mechanism responsive to code combinations of impulses to condition the receiver for operation, said mechanism comprising a cam drum subjected to a constant torque and operated in synchronism with the speed of code impulsing, means for arresting said drum, means for holding said arresting means in operative position, means controlled by an element in said selector mechanism to operate said holding means, said holding means and arresting means provided with cooperating cam slot and follower elements, and means for effecting relative movement between said holding means and said arresting means, whereby orientation of said cam drum may be effected through the instrumentality of said cam slot and follower elements, said last recited means comprising a knob and detent arrangement having an internal gear integral with said knob, said gear having V-shaped teeth on said detent so that the peaks of a predetermined number of pairs of teeth will mesh in interlocking engagement in each adjusted position of said orientation.

5. In a telegraph receiver, a selecting mechanism responsive to received code combinations of electrical impulses comprising a set of selectors, a frictionally driven rotatable cam member for governing said selectors, said member having a stop disc, signal responsive means having an armature, a stop member having a stop portion and a cam follower portion, a rotatable orientation plate mounted concentrically with said cam member, said stop member pivotally mounted on said plate and adapted through its stop portion to coact with said stop disc to stop said cam member in various angularly adjusted positions, a stationarily pivoted lever normally latched by said armature, spring means acting to rotate said lever when said lever is unlatched in response to a start signal, cam means operative during the rotation of said rotatable cam member to return said lever to said normal latched position against the action of said spring means, said lever and said stop member having cooperating cam and slot facilities for constraining said stop member to move with said lever through the articulation of said follower portion with said cam slot, said cam slot conformed to cooperate with said follower portion in all adjusted positions of said stop member, whereby orientation of said cam member with respect to said selectors, is effected, and a knob and detent adjusting means comprising an internal gear integral with said knob, said gear having V-shaped teeth adapted to cooperate with a lesser number of identical teeth on said detent so that the peaks of a predetermined number of pairs of teeth will mesh in interlocking meshing engagement in each adjusted position of said orientation.

6. In a telegraph receiver, a selector mechanism responsive to code combinations of impulses to condition the receiver for operation, said mechanism comprising a cam drum subjected to a constant torque and operated in synchronism with the speed of code impulsing, a rotatable orientation plate mounted concentrically with said cam drum, stop means mounted on said plate for controlling said cam drum, rack and pinion means operably associated with said plate for rotating said plate to various angularly adjusted positions, whereby orientation of said cam drum is effected, a vernier-type adjusting means comprising a fixed portion and a rotatable portion operably associated with said rack and pinion means, said rotatable portion having a predetermined number of teeth adapted to cooperate with a predetermined lesser number of teeth on said fixed portion, whereby the peaks of a predetermined number of pairs of teeth will mesh in interlocking manner in each adjusted position of said orientation.

7. In a receiver, a rotatable instrumentality consecutively coacting with a plurality of members in response to received impulses, and an adjustable means for variably relating the positions of said instrumentality with respect to said received impulses, said means including a first element comprising an internal gear having V-shaped teeth adapted to cooperate with a lesser number of similar teeth on a second element, whereby the peaks of a predetermined number of pairs of teeth will mesh in interlocking engagement in each adjusted position of said instrumentality.

8. In a receiver, a rotatable instrumentality consecutively coacting with a plurality of members in response to received impulses, and an adjustable means for variably relating the positions of said instrumentality with respect to said received impulses, said means including a first element comprising an internal gear having a predetermined number of V-shaped teeth adapted to cooperate with a predetermined number of similar teeth on a second element according to a predetermined ratio, whereby the peaks of a resultant number of pairs of teeth will mesh in interlocking engagement in each adjusted position of said instrumentality.

9. In a telegraph receiver, a selector mechanism responsive to code combinations of impulses to condition the receiver for operation, said mechanism comprising a cam member subjected to a constant torque and operated in synchronism with the speed of code impulsing, a support adjustable on an axis coincident with the axis of said cam member, stop means mounted on said support for controlling said cam member, positive mechanical means for effecting the adjustment of said support to secure the proper orientation of the cam member with the received code combinations of impulses, and means operably associated with said positive mechanical means comprising a first element and a second element, said first element including an internal gear having V-shaped teeth adapted to cooperate with a lesser number of similar teeth on said second element according to a predetermined ratio, whereby the peaks of a predetermined number of pairs of teeth will mesh in interlocking engagement in each adjusted position of said cam member.

10. In a telegraph receiver, a selector mechanism responsive to code combinations of impulses to condition the receiver for operation, said mechanism comprising a cam member subjected to a constant torque and operated in synchronism with the speed of code impulsing, a support adjustable on an axis coincident with the axis of said cam member, stop means mounted on said support for controlling said cam member, positive mechanical means for effecting the adjustment of said support to secure the proper orientation of the cam member with the received code combinations of impulses, and means operably associated with said positive mechanical means comprising a first element and a second element, said first element including an internal gear having a predetermined number of V-shaped teeth adapted to cooperate with a predetermined number of similar teeth on a second element, according to a predetermined ratio, whereby the peaks of a resultant number of pairs of teeth will mesh in interlocking engagement in each adjusted position of said cam member.

11. In a receiver, a rotatable instrumentality consecutively coacting with a plurality of members in response to received impulses, and an adjustable means for variably relating the positions of said instrumentality with respect to said received impulses, said means including a first element comprising an internal gear having a predetermined number of teeth adapted to cooperate with a predetermined number of similar teeth on a second element according to a predetermined ratio, whereby the peaks of a resultant number of pairs of teeth will mesh in interlocking engagement in each adjusted position of said instrumentality.

CARL W. SWAN.

No references cited